(12) United States Patent
Wang et al.

(10) Patent No.: US 9,413,473 B2
(45) Date of Patent: Aug. 9, 2016

(54) SYSTEM, METHOD AND COMPUTER STORAGE MEDIUM FOR CALIBRATING RF TRANSCEIVER

(71) Applicant: Zhongxing Microelectronics Technology Co.Ltd, Shenzhen, Guangdong (CN)

(72) Inventors: Yongtao Wang, Shenzhen (CN); Haolv Xie, Shenzhen (CN); Zhuoyao Wang, Shenzhen (CN)

(73) Assignee: ZHONGXING MICROELECTRONICS TECHNOLOGY CO. LTD, Shenzhen, Guangdong (CN)

( * ) Notice: Subject to any disclaimer, the term of this patent is extended or adjusted under 35 U.S.C. 154(b) by 0 days.

(21) Appl. No.: 14/778,865

(22) PCT Filed: Nov. 24, 2014

(86) PCT No.: PCT/CN2014/092055
§ 371 (c)(1),
(2) Date: Sep. 21, 2015

(87) PCT Pub. No.: WO2015/139474
PCT Pub. Date: Sep. 24, 2015

(65) Prior Publication Data
US 2016/0056903 A1     Feb. 25, 2016

(30) Foreign Application Priority Data

Mar. 17, 2014    (CN) .......................... 2014 1 0099444

(51) Int. Cl.
*H04B 1/38*      (2015.01)
*H04B 17/14*    (2015.01)
(Continued)

(52) U.S. Cl.
CPC .................. *H04B 17/14* (2015.01); *H04B 1/52* (2013.01); *H04B 1/525* (2013.01); *H04L 25/06* (2013.01); *H04B 1/38* (2013.01)

(58) Field of Classification Search
CPC ............ H04B 1/38; H04B 17/14; H04B 1/52; H04L 25/06
See application file for complete search history.

(56) References Cited

U.S. PATENT DOCUMENTS

| 5,513,215 A | 4/1996 | Marchetto |
| 5,751,114 A | 5/1998 | Dingsor |

(Continued)

FOREIGN PATENT DOCUMENTS

| CN | 1131490 A | 9/1996 |
| CN | 101651474 A | 2/2010 |

(Continued)

OTHER PUBLICATIONS

English Translation of the Written Opinion of the International Search Authority in international application No. PCT/CN2014/092055, mailed on Feb. 17, 2015.

(Continued)

*Primary Examiner* — Jaison Joseph
(74) *Attorney, Agent, or Firm* — Oppedahl Patent Law Firm LLC

(57) ABSTRACT

Disclosed is a system, method and computer storage medium for calibrating a Radio Frequency (RF) transceiver, and the system includes a compensator for a transmission path, a compensator for a reception path, an estimator, a memory and a translational mixer.

15 Claims, 5 Drawing Sheets

(51) Int. Cl.
   *H04L 25/06*   (2006.01)
   *H04B 1/52*    (2015.01)
   *H04B 1/525*   (2015.01)

(56) References Cited

U.S. PATENT DOCUMENTS

| | | | |
|---|---|---|---|
| 7,782,928 B2 * | 8/2010 | Kang | H03D 3/008 |
| | | | 375/219 |
| 7,856,048 B1 | 12/2010 | Smaini | |
| 8,284,824 B1 | 10/2012 | Smaini | |
| 8,559,488 B1 | 10/2013 | Smaini | |
| 8,670,739 B1 | 3/2014 | Murphy et al. | |
| 8,854,989 B2 | 10/2014 | Huang | |
| 9,001,875 B1 | 4/2015 | Smaini et al. | |
| 2006/0034356 A1 | 2/2006 | Fechtel | |
| 2007/0047634 A1 | 3/2007 | Kang | |
| 2008/0160935 A1 * | 7/2008 | Rexberg | H03F 1/3247 |
| | | | 455/114.3 |
| 2011/0013724 A1 | 1/2011 | Metreaud | |
| 2011/0069767 A1 * | 3/2011 | Zhu | H04L 27/368 |
| | | | 375/259 |
| 2012/0281550 A1 | 11/2012 | Huang | |
| 2013/0287082 A1 | 10/2013 | Chen et al. | |
| 2013/0301858 A1 | 11/2013 | Pedersen | |
| 2014/0301501 A1 | 10/2014 | Chen et al. | |
| 2014/0369442 A1 | 12/2014 | Huang | |

FOREIGN PATENT DOCUMENTS

| | | |
|---|---|---|
| CN | 102130697 A | 7/2011 |
| CN | 103490788 A | 1/2014 |
| WO | 9744940 A1 | 11/1997 |
| WO | 2010124298 A2 | 10/2010 |
| WO | 2012049311 A1 | 4/2012 |

OTHER PUBLICATIONS

International Search Report in international application No. PCT/CN2014/092055, mailed on Feb. 17, 2015.

Supplementary European Search Report in European application No. 14886299.8, mailed on Mar. 14, 2016.

* cited by examiner

SYSTEM, METHOD AND COMPUTER STORAGE MEDIUM FOR CALIBRATING RF TRANSCEIVER

TECHNICAL FIELD

The present disclosure relates to the field of Radio Frequency (RF) calibration, and in particular to a system, method and computer storage medium for calibrating an RF transceiver.

BACKGROUND

At present, an RF transceiver used widely in a wireless communication system generally has two signal pathways in both a transmission path and a reception path, i.e., In-phase (I) pathway and Quadrature (Q) pathway. But due to reasons such as manufacturing cost, process and power consumption, a Local Oscillator (LO) of the RF transceiver cannot make ideally its amplitude be equal to those of signals of the two pathways, and cannot make its phase be completely orthogonal to that of a signal of the quadrature pathway, thus IQ mismatch may occur at the transmission path and the reception path; in addition, due to reasons such as DC offset of the transmission path and a coupling effect of an IC, the RF transceiver may suffer from carrier leakage at LO frequency of the local oscillator at the transmission path.

SUMMARY

In view of the above, embodiments of the disclosure are intended to provide a system, method and computer storage medium for calibrating an RF transceiver that can calibrate simultaneously carrier leakage of a transmission path and IQ mismatch of the transmission path and reception path.

To this end, the technical solutions of embodiments of the disclosure are implemented as follows.

An embodiment of the disclosure provides a system for calibrating an RF transceiver, applied in an RF transmission/reception system, including a compensator for a transmission path, a compensator for a reception path, an estimator, a memory and a translational mixer, specifically, the memory is configured to store compensation parameters;

the compensator for the transmission path is configured to compensate, through amplification and superposition, a received in-phase baseband transmission signal I_tx and a received quadrature baseband transmission signal Q_tx to obtain a compensated in-phase baseband transmission signal I_atx and a compensated quadrature baseband transmission signal Q_atx, and process the compensated in-phase baseband transmission signal I_atx and the compensated quadrature baseband transmission signal Q_atx through the transmission path and a DAC of the RF transmission/reception system to form and output a transmission RF signal Tx_out;

the translational mixer is configured to compensate a received transmission RF signal Tx_out with a difference between a transmission LO frequency and a reception LO frequency, and transmit a compensated Tx_out as a reception RF signal Rx_in to the reception path of the RF transmission/reception system to form respectively an in-phase baseband reception signal I_rx of an Reception I branch and a quadrature baseband reception signal Q_rx of a Reception Q branch;

the compensator for the reception path is configured to compensate, through amplification and superposition, a received in-phase baseband reception signal I_rx and a received quadrature baseband reception signal Q_rx to obtain a compensated in-phase baseband reception signal I_arx and a compensated quadrature baseband reception signal Q_arx, and transmit the compensated in-phase baseband reception signal I_arx and the compensated quadrature baseband reception signal Q_arx to the estimator; and the estimator is configured to estimate compensation parameters of the compensated in-phase baseband reception signal I_arx and of the compensated quadrature baseband reception signal Q_arx, and update the compensation parameters stored in the memory using estimated compensation parameters.

In the above solution, the compensator for the transmission path may be configured to amplify the in-phase baseband transmission signal I_tx using a first amplifier to obtain a first signal, amplify the quadrature baseband transmission signal Q_tx using a second amplifier to obtain a second signal, superpose the first signal and the second signal using a first adder to obtain a third signal, and then superpose the third signal and a first DC compensation parameter DCi using a second adder to obtain the compensated in-phase baseband transmission signal I_atx; and the compensator for the transmission path may be further configured to amplify the quadrature baseband transmission signal Q_tx using a third amplifier to obtain a fourth signal, amplify the in-phase baseband transmission signal I_tx using a fourth amplifier to obtain a fifth signal, superpose the fourth signal and the fifth signal using a third adder to obtain a sixth signal, and then superpose the sixth signal and a second DC compensation parameter DCq using a fourth adder to obtain the compensated quadrature baseband transmission signal Q_atx.

In the above solution, the translational mixer may be configured to generate a compensation signal $S_{tm}$ through a local oscillator of the translational mixer, mix the compensation signal $S_{tm}$ and the transmission RF signal Tx_out to obtain a mixed signal, and transmit the mixed signal as the reception RF signal to the reception path of the RF transmission/reception system.

In the above solution, the compensator for the reception path is configured to amplify the in-phase baseband reception signal I_rx using a fifth amplifier to obtain a seventh signal, amplify the quadrature baseband reception signal Q_rx using a sixth amplifier to obtain an eight signal, and superpose the seventh signal and the eighth signal using a fifth adder to obtain the compensated in-phase baseband reception signal I_arx;

the compensator for the reception path may be further configured to amplify the quadrature baseband reception signal Q_rx using a seventh amplifier to obtain a ninth signal, amplify the in-phase baseband reception signal I_rx using an eighth amplifier to obtain a tenth signal, and superpose the ninth signal and the tenth signal using a sixth adder to obtain the compensated quadrature baseband reception signal Q_arx.

In the above solution, the estimator may include a single point Discrete Fourier Transform (DFT) calculation module and a compensation parameter calculation module, specifically, the single point DFT calculation module is configured to receive the compensated in-phase baseband reception signal I_arx and the compensated quadrature baseband reception signal Q_arx transmitted by the compensator for the reception path, obtain, according to the compensated in-phase baseband reception signal I_arx and the compensated quadrature baseband reception signal Q_arx, powers of an image signal generated from IQ mismatch of the transmission path of the RF transmission/reception system, of an image signal generated from carrier leakage of the RF transmission/reception system and of an image signal generated from IQ mismatch of the reception path of the RF transmission/reception system, and transmit the powers of the three image signals to the compensation parameter calculation module; and the compensation parameter calculation module is configured to estimate a compensation parameter minimizing the powers of the three image signals by searching powers of the three image signals through a binary search, and transmit the estimated compensation parameter to the memory so that the memory updates its existing compensation parameter to the estimated compensation parameter.

In the above solution, the compensation parameter calculation module may be further configured to, before estimating the powers of the three image signals through a binary search, determine an initial searching interval corresponding to the powers of the three image signals.

An embodiment of the disclosure provides a method for calibrating an RF transceiver, applied in a system for calibrating the RF transceiver, the system being applied in the RF transceiver and including a compensator for a transmission path, a compensator for a reception path, an estimator, a memory and a translational mixer, and the method includes:

the compensator for the transmission path receives an in-phase baseband transmission signal I_tx and a quadrature baseband transmission signal generated by a single frequency signal generator of the RF transceiver;

the compensator for the transmission path compensates, through amplification and superposition, the in-phase baseband transmission signal I_tx and the quadrature baseband transmission signal Q_tx to obtain a compensated in-phase baseband transmission signal I_atx and a compensated quadrature baseband transmission signal Q_atx, and processes the compensated in-phase baseband transmission signal I_atx and the compensated quadrature baseband transmission signal Q_atx through the transmission path and a Digital to Analog Converter (DAC) of the RF transceiver to form and output a transmission RF signal Tx_out;

the translational mixer compensates a received transmission RF signal Tx_out with a difference between a transmission LO frequency and a reception LO frequency, and transmits a compensated Tx_out as a reception RF signal Rx_in to the reception path of the RF transceiver to form respectively an in-phase baseband reception signal I_rx of an Reception I branch and a quadrature baseband reception signal Q_rx of a Reception Q branch;

the compensator for the reception path compensates, through amplification and superposition, the received in-phase baseband reception signal I_rx and the received quadrature baseband reception signal Q_rx to obtain a compensated in-phase baseband reception signal I_arx and a compensated quadrature baseband reception signal Q_arx, and transmits the compensated in-phase baseband reception signal I_arx and the compensated quadrature baseband reception signal Q_arx to the estimator; and the estimator estimates compensation parameters of the compensated in-phase baseband reception signal I_arx and of the compensated quadrature baseband reception signal Q_arx, and updates compensation parameters stored in the memory using estimated compensation parameters, wherein the compensation parameters comprise transmission related compensation parameters and reception related compensation parameters.

In the above solution, the step that the compensator for the transmission path compensates, through amplification and superposition, the in-phase baseband transmission signal I_tx and the quadrature baseband transmission signal Q_tx to obtain a compensated in-phase baseband transmission signal I_atx and a compensated quadrature baseband transmission signal Q_atx may include:

the compensator for the transmission path amplifies the in-phase baseband transmission signal I_tx with a first preset amplification factor, superposes an amplified in-phase baseband transmission signal I_tx and a quadrature baseband transmission signal Q_tx amplified with a second preset amplification factor, and superposes a superposed signal and a first DC compensation parameter DCi to obtain the compensated in-phase baseband transmission signal; and the compensator for the transmission path amplifies the quadrature baseband transmission signal Q_tx with a third preset amplification factor, superposes an amplified quadrature baseband transmission signal Q_tx and an in-phase baseband transmission signal I_tx amplified with the second preset amplification factor, and superposes a superposed signal and a second DC compensation parameter DCq to obtain the compensated quadrature baseband transmission signal.

In the above solution, the step that the translational mixer compensates a received transmission RF signal Tx_out with a difference between a transmission LO frequency and a reception LO frequency may include:

the translational mixer generates a compensation signal $S_{tm}$ with a frequency of $f_{tm}$, wherein $f_{tm}$ is the difference between the transmission LO frequency and the reception LO frequency;

the translational mixer mixes the compensation signal $S_{tm}$ and the transmission RF signal Tx_out.

In the above solution, the step that the compensator for the reception path compensates, through amplification and superposition, the received in-phase baseband reception signal I_rx and the received quadrature baseband reception signal Q_rx to obtain a compensated in-phase baseband reception signal I_arx and a compensated quadrature baseband reception signal Q_arx may include:

the compensator for the reception path amplifies the in-phase baseband reception signal I_rx with a fourth preset amplification factor, and superposes an amplified in-phase baseband reception signal I_rx and a quadrature baseband reception signal Q_rx amplified with a fifth preset amplification factor to obtain the compensated in-phase baseband reception signal I_arx; and the compensator for the reception path amplifies the quadrature baseband reception signal Q_rx with a sixth preset amplification factor, and superposes an amplified quadrature baseband reception signal Q_rx and an in-plane baseband reception signal I_rx amplified with the fifth preset amplification factor to obtain the compensated quadrature baseband reception signal Q_arx.

In the above solution, the step that the estimator estimates compensation parameters of the compensated in-phase baseband reception signal I_arx and of the compensated quadrature baseband reception signal Q_arx may include:

the estimator receives the compensated in-phase baseband reception signal I_arx and the compensated quadrature baseband reception signal Q_arx transmitted by the compensator for the reception path;

powers of an image signal generated from IQ mismatch of the transmission path of the RF transceiver, of an image signal generated from carrier leakage of the RF transceiver and of an image signal generated from IQ mismatch of the reception path of the RF transceiver are obtained according to the compensated in-phase baseband reception signal I_arx and the compensated quadrature baseband reception signal Q_arx; and the estimator estimates a compensation parameter minimizing the powers of the three image signals by searching powers of the three image signals through a binary search.

powers of an image signal generated from IQ mismatch of the transmission path of the RF transceiver, of an image signal generated from carrier leakage of the RF transceiver and of an image signal generated from IQ mismatch of the reception path of the RF transceiver are obtained according to the compensated in-phase baseband reception signal I_arx and the compensated quadrature baseband reception signal Q_arx; and the estimator performs a single point DFT calculation on a complex signal of a baseband reception signal acquired from the compensated in-phase baseband reception signal I_arx and the compensated quadrature baseband reception signal Q_arx to obtain respective frequencies $f_{tximage}$, $f_{cl}$, and $f_{rximage}$ at which the image signals generated from IQ mismatch of the transmission path, carrier leakage and IQ mismatch of the reception path are located;

the estimator multiplies the complex signal of the baseband reception signal by three sequences $e^{-j(2\pi f_{tximage}/f_s*N)}$, $e^{-j(2\pi f_{cl}/f_s*N)}$, and $e^{-j(2\pi f_{rximage}/f_s*N)}$ respectively, and reduces, through a low pass filter, impact of other signals on respective powers of multiplied complex signals to obtain filtered signals $I_{tximage}+jQ_{tximage}$, $I_{cl}+jQ_{cl}$, and $I_{rximage}+jQ_{rximage}$, wherein $f_s$ is a sampling frequency of an Analog to Digital Converter (ADC) of the Reception I branch of the RF transceiver and of an ADC of the Reception Q branch of the RF transceiver, and N is a sequence length;

the power of the image signal generated from IQ mismatch of the transmission path is obtained by calculating $|I_{tximage}|+|Q_{tximage}|$, the power of the image signal generated from carrier leakage is obtained by calculating $|I_{cl}|+|Q_{cl}|$, and the power of the image signal generated from IQ mismatch of the reception path is obtained by calculating $|I_{rximage}|+|Q_{rximage}|$, wherein |●| represents a modulo of ●.

In the above solution, the step that the estimator estimates a compensation parameter minimizing the powers of the three image signals by searching powers of the three image signals through a binary search may include:

the estimator takes a first transmission path compensation parameter $g_1$ and a second transmission path compensation parameter $\theta_1$ of the transmission related compensation parameter as a first parameter group corresponding to the power of the image signal generated from IQ mismatch of the transmission path, takes a first reception path compensation parameter $g_2$ and a second reception path compensation parameter $\theta_2$ of the reception related compensation parameter as a second parameter group corresponding to the power of the image signal generated from IQ mismatch of the reception path, and takes a first DC compensation parameter DCi and a second DC compensation parameter DCq of the transmission related compensation parameter as a third parameter group corresponding to the power of the image signal generated from carrier leakage; and the estimator calculates the first parameter group, the second parameter group and the third parameter group respectively, which may include:

step 1A, the estimator selects any parameter group of the first parameter group, the second parameter group and the third parameter group, and a two-dimensional search interval corresponding to a selected parameter group;

step 2A, the estimator divides an interval in each dimension of the two-dimensional search interval equally into four sub-intervals to obtain five endpoints of the four sub-intervals of the interval in each dimension;

step 3A, the estimator substitutes the five endpoints of the interval in each dimension into a power of an image signal corresponding to the selected parameter group to acquire an endpoint of the interval in each dimension, which minimizes the power of the image signal corresponding to the selected parameter group;

step 4A, the estimator sets, as a middle point, the endpoint of the interval in each dimension, which minimizes the power of the image signal corresponding to the selected parameter group, and takes two endpoints before and after the middle point as boundary points to obtain a new search interval;

step 5A, the estimator takes, as the selected parameter group, the endpoint of the interval in each dimension, which minimizes the power of the image signal corresponding to the selected parameter group so that a single point DFT module figures out power of an image signal corresponding to a newly selected parameter group; and step 6A, the estimator repeats the step 2A in the new search interval until a preset number is reached so as to obtain a parameter group minimizing power of an image signal corresponding to the parameter group.

In the above solution, the method may further include: before the estimator calculates the first parameter group, the second parameter group and the third parameter group respectively, the estimator determines initial search intervals corresponding respectively to the first parameter group, the second parameter group and the third parameter group, which may include:

the estimator determines the initial search intervals corresponding respectively to the first parameter group, the second parameter group and the third parameter group by implementing the steps 1A to 6A three to five times, or through a particle filter algorithm or Sequential Importance Sampling (SIS).

An embodiment of the disclosure further provides a computer storage medium, in which computer-readable instructions are included, wherein the computer-readable instructions are configured to implement the method for calibrating an RF transceiver described above.

The embodiments of the disclosure provide a method, system and computer storage medium for calibrating an RF transceiver, relevant compensation parameters are obtained by performing parameter search on image signals of baseband reception signals, which are generated from IQ mismatch of the transmission path and of the reception path and from carrier leakage, thus impacts resulted from IQ mismatch of the transmission path and of the reception path and from carrier leakage are eliminated, and carrier leakage of the transmission path and IQ mismatch of the transmission path and of reception path are calibrated.

DETAILED DESCRIPTION

The technical solutions in the embodiments of the disclosure will be described below clearly and completely with reference to the accompanying drawings.

In order to calibrate simultaneously carrier leakage of a transmission path and IQ mismatch of the transmission path and reception path, the system for calibrating an RF transceiver according to the embodiment of the disclosure can be applied in a commonly used RF transmission/reception system, so that specific technical solutions of the embodiments of the disclosure can be described in detail.

Figure 1:
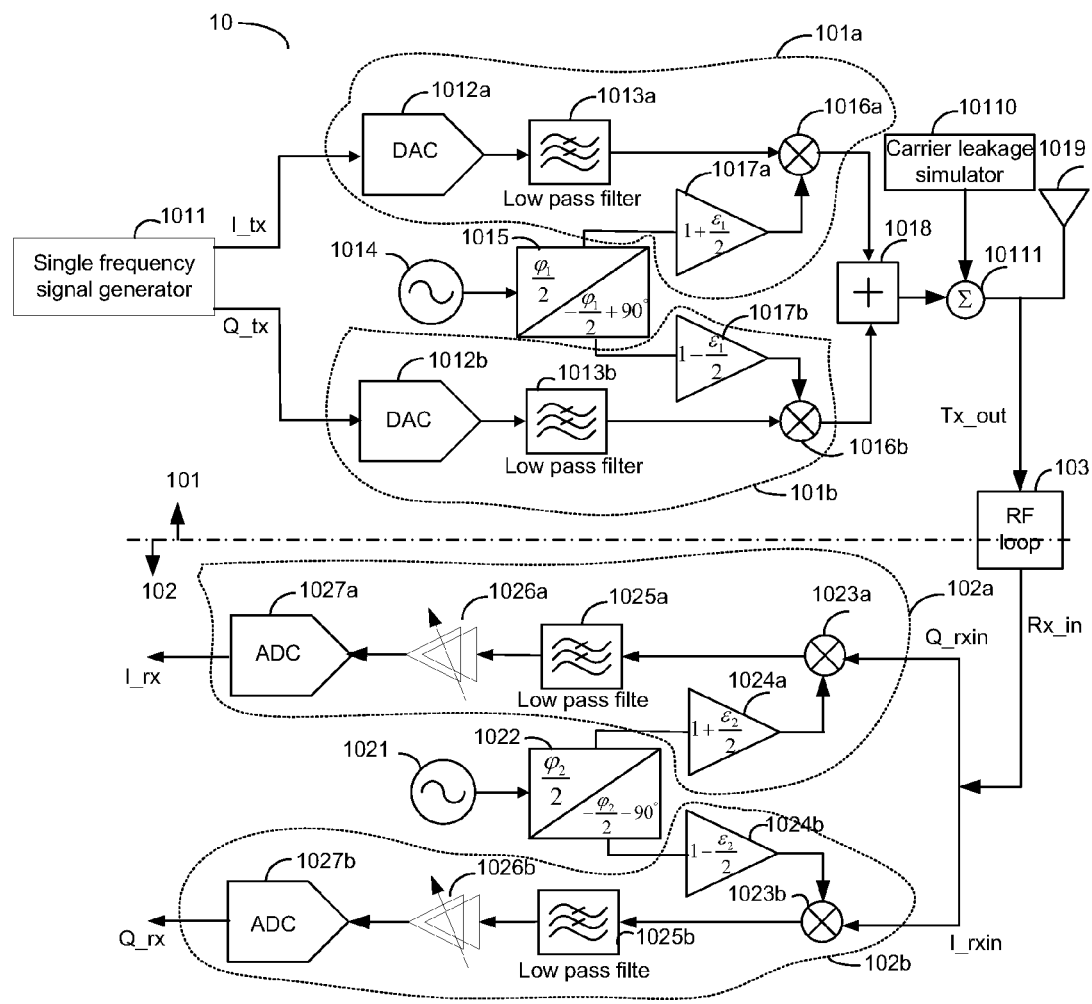
FIG. 1 is a schematic structural diagram of a commonly used RF transmission/reception system.

FIG. 1 shows a commonly used RF transmission/reception system 10 used for IQ modulation and demodulation in various wireless communication systems. As shown in FIG. 1, the RF transmission/reception system 10 may include a transmission path 101 and a reception path 102, in FIG. 1, the path above the dash dot line is the transmission path 101 and the path below the dash dot line is the reception path 102.

Specifically, the transmission path can generate, through a single frequency signal generator 1011, two baseband signals I_tx and Q_tx having a same frequency $f_{sig}$ and phases orthogonal to one another, I_tx=cos($2\pi f_{sig} t+\phi_{sig}$) can be referred to as an in-phase baseband transmission signal, Q_tx=sin ($2\pi f_{sig} t+\phi_{sig}$) can be referred to as a quadrature baseband transmission signal, $\phi_{sig}$ is the phase of the baseband signal; then the in-phase baseband transmission signal is transmitted to a transmission in-phase I branch 101a and the quadrature baseband transmission signal is transmitted to a transmission quadrature Q branch 101b.

In the transmission I branch 101a, a Digital to Analog Converter (DAC) 1012a and a Low pass Filter (LF) 1013a are used firstly to convert the in-phase baseband transmission signal from a digital signal to an analog signal; it can be appreciated that after passing through the DAC 1012a and the LF 1013a, the in-phase baseband transmission signal only changes its representation type and its expression is still I_tx=cos($2\pi f_{sig} t+\phi_{sig}$); accordingly, in the transmission Q branch 101b, a DAC 1012b and an LF 1013b are also used to convert the quadrature baseband transmission signal from a digital signal to an analog signal; it can be appreciated that after passing through the DAC 1012b and the LF 1013b, the quadrature baseband transmission signal only changes its representation type and its expression is still Q_tx=sin($2\pi f_{sig} t+\phi_{sig}$).

Then a transmission local oscillator 1014 may take a transmission LO signal LO_tx=cos($2\pi f_{txlo}t+\phi_{tx}$) generated therefrom as a transmission carrier, ideally, the transmission LO signal may be shifted by a phase of 0° by a phase shifter 1015 to obtain a transmission in-phase LO signal LOI_tx0=cos ($2\pi f_{txlo}t+\phi_{tx}$) and LOI_tx0 is mixed with an in-phase baseband transmission signal transmitted from the LF 1013a of the transmission I branch, specifically, a mixer 1016a may be used to perform up-mixing on LOI_tx0 and I_tx to obtain an in-phase mixed transmission signal of the I branch, wherein $f_{txlo}$ is the LO frequency of the transmission local oscillator 1014, $\phi_{tx}$ is the LO phase of the transmission local oscillator 1014; accordingly, ideally, the transmission LO signal may be shifted by a phase of 90° by the phase shifter 1015 to obtain a transmission quadrature LO signal LOQ_tx0=sin($2\pi f_{txlo}t+\phi_{tx}$), and LOQ_tx0 is mixed with a quadrature baseband transmission signal transmitted from a low pass filter 1013b of the transmission Q branch, specifically, a mixer 1016b may be used to perform up-mixing on LOQ_tx0 and Q_tx to obtain a quadrature mixed transmission signal of the Q branch, similarly, $f_{txlo}$ is the LO frequency of the transmission local oscillator 1014, and $\phi_{tx}$ is the LO phase of the transmission local oscillator 1014.

However, in practical applications, due to reasons such as manufacturing cost, process and power consumption, the transmission local oscillator may suffer from IQ mismatch of a transmission path, at this time, the transmission in-phase LO signal to be mixed with the in-phase baseband transmission signal is obtained from shifting, by the phase shifter 1015, the transmission LO signal generated from the transmission local oscillator 1014 by a phase $$\frac{\varphi_1}{2}$$

and then amplifying, by an amplifier 1017a, the shifted transmission LO signal with an amplification factor of $$\left(1+\frac{\varepsilon_1}{2}\right),$$

therefore, in practical applications, the transmission in-phase LO signal to be mixed with the in-phase baseband transmission signal is $$LOI\_tx = \left(1+\frac{\varepsilon_1}{2}\right)\cos\left(2\pi f_{txlo}t + \varphi_{tx} + \frac{\varphi_1}{2}\right);$$

accordingly, the transmission quadrature LO signal to be mixed with the quadrature baseband transmission signal is obtained from shifting, by the phase shifter 1015, the transmission LO signal generated from the transmission local oscillator 1014 by a phase $$\left(-\frac{\varphi_1}{2}+90°\right)$$

and then amplifying, by an amplifier 1017b, the shifted transmission LO signal with an amplification factor of $$\left(1-\frac{\varepsilon_1}{2}\right),$$

therefore, in practical applications, the transmission quadrature LO signal to be mixed with the quadrature baseband transmission signal is $$\text{LOQ\_tx} = -\left(1 - \frac{\varepsilon_1}{2}\right)\sin\left(2\pi f_{txlo}t + \varphi_{tx} - \frac{\varphi_1}{2}\right).$$

Finally, ideally, an adder 1018 may be used to superpose the in-phase mixed transmission signal and the quadrature mixed transmission signal, and then the superposed mixed signal is transmitted, by an transmission antenna 1019, as a transmission RF signal Tx_out to external space.

However, in practical applications, due to DC mismatch of the transmission path and coupling effect of an IC, at the LO frequency of the local oscillator, the RF transceiver may suffer from carrier leakage on the transmission path 101, therefore, the transmission RF signal Tx_out in practical applications can be obtained from a further superposition, through an adder 10111, of an ideally superposed mixed signal and leaked transmission carrier $A\cos(2\pi f_{lo}t+\phi_{cl})$ simulated by a carrier leakage simulator 10110.

In order to illustrate technical solutions of embodiments of the disclosure, after passing through an RF loop 103, the transmission RF signal Tx_out may be transmitted as a reception RF signal Rx_in to the reception path 102.

Specifically, the reception path 102 may separate the reception RF signal Rx_in into an in-phase RF reception signal I_rxin and a quadrature RF reception signal Q_rxin having a same frequency and phases orthogonal to one another, and may transmit the in-phase RF reception signal I_rxin to a reception in-phase I branch 102a and transmit the quadrature RF reception signal Q_rxin to a reception quadrature Q branch 102b;
firstly, a reception local oscillator 1021 may take a reception LO signal $LO\_rx=\cos(2\pi f_{rxlo}t+\phi_{rx})$ generated therefrom as a reception carrier, ideally, the reception LO signal may be shifted by a phase of 0° by a phase shifter 1022 to obtain a reception in-phase LO signal $LOI\_rx0=\cos(2\pi f_{rxlo}t+\phi_{rx})$ and LOI_rx0 is mixed with an in-phase baseband reception signal transmitted from the reception I branch 102a, specifically, a mixer 1023a may be used to perform down-mixing on LOI_rx0 and I_txin to obtain an in-phase baseband reception signal I_tx of the reception I branch 102a, wherein $f_{rxlo}$ is the LO frequency of the reception local oscillator 1021, $\phi_{rx}$, is the LO phase of the reception local oscillator 1021; accordingly, the reception LO signal may be shifted by a phase of 90° by the phase shifter 1022 to obtain a reception quadrature LO signal $LOQ\_rx0=\sin(2\pi f_{rxlo}t+\phi_{rx})$, and LOQ_rx0 is mixed with a quadrature baseband reception signal transmitted from the reception Q 102b branch, specifically, a mixer 1023b may be used to perform down-mixing on LOQ_rx0 and Q_txin to obtain a quadrature baseband reception signal of the reception Q branch, similarly, $f_{rxlo}$ is the LO frequency of the reception local oscillator 1021, and $\phi_{rx}$ is the LO phase of the reception local oscillator 1021.

However, in practical applications, due to reasons such as manufacturing cost, process and power consumption, the reception local oscillator may also suffer from IQ mismatch of a reception path, at this time, the reception in-phase LO signal to be mixed with the in-phase RF reception signal I_rxin is obtained from shifting, by the phase shifter 1022, the reception LO signal generated from the reception local oscillator 1021 by a phase $$\frac{\varphi_2}{2}$$

and then amplifying, by an amplifier 1024a, the shifted reception LO signal with an amplification factor of $$\left(1 + \frac{\varepsilon_2}{2}\right),$$

therefore, in practical applications, the reception in-phase LO signal to be mixed with I_rxin is $$\text{LOI\_rx} = \left(1 + \frac{\varepsilon_2}{2}\right)\cos\left(2\pi f_{rxlo}t + \varphi_{rx} + \frac{\varphi_2}{2}\right);$$

accordingly, the reception quadrature LO signal to be mixed with the reception quadrature RF signal Q_rxin is obtained from shifting, by the phase shifter 1022, the reception LO signal generated from the reception local oscillator 1021 by a phase $$\left(-\frac{\varphi_2}{2} - 90°\right)$$

and then amplifying, by an amplifier 1024b, the shifted reception LO signal with an amplification factor of $$\left(1 - \frac{\varepsilon_2}{2}\right),$$

therefore, in practical applications, the reception quadrature LO signal to be mixed with Q_rxin is $$\text{LOQ\_rx} = \left(1 - \frac{\varepsilon_2}{2}\right)\sin\left(2\pi f_{rxlo}t + \varphi_{rx} - \frac{\varphi_2}{2}\right).$$

Then, in the reception I branch 102a, after the mixed in-phase baseband reception signal I_rx passes through a low pass filter 1025a, a variable gain amplifier 1026a and an Analog to Digital Converter (ADC) 1027a, an in-phase baseband reception signal I_rx in a digital form can be obtained.

It should be noted that the in-phase baseband reception signal I_rx and the mixed in-phase baseband reception signal I_rx are only different types of representation, both signals have the same expression; accordingly, in the reception Q branch 102b, ager the mixed quadrature baseband reception signal Q_rx passes through a low pass filter 1025b, a variable gain amplifier 1026b and an ADC 1027b, a quadrature baseband reception signal Q_rx in a digital form can be obtained, it should also be noted that the quadrature baseband reception signal Q_rx and the mixed quadrature baseband reception signal Q_rx are only different types of representation, both signals have the same expression; it can be appreciated that the I_rx in the digital form and the Q_rx in the digital form are namely a reception baseband signal.

It should also be noted that in practical applications the IQ mismatch of the transmission path, the carrier leakage and the IQ mismatch of the reception path may enable both the in-phase baseband reception signal I_rx and the quadrature baseband reception signal Q_rx to additionally include therein respective image signals generated from the IQ mismatch of the transmission path, the carrier leakage and the IQ mismatch of the reception path, these three image signals may become interferences to the in-phase baseband reception signal I_rx and the quadrature baseband reception signal Q_rx, because, ideally, energies of the in-phase baseband reception signal I_rx and of the quadrature baseband reception signal Q_rx exist only at a frequency of $f_{rxsig}=f_{txlo}+f_{sig}-f_{rxlo}$, but in practical applications, due to the existence of the three image signals, the energies of the in-phase baseband reception signal I_rx and of the quadrature baseband reception signal Q_rx will be distributed at frequencies of $f_{tximage}=f_{txlo}+f_{sig}-f_{rxlo}$, $f_{cl}=f_{txlo}-f_{rxlo}$ and $f_{rximage}=-(f_{txlo}+f_{sig}-f_{rxlo})$ wherein $f_{tximage}$ represents a frequency at which an image signal generated from the IQ mismatch of the transmission path is located, $f_{cl}$, represents a frequency at which an image signal generated from the carrier leakage is located, and $f_{rximage}$ represents a frequency at which an image signal generated from the IQ mismatch of the reception path is located.

According to the Law of Conservation of Energy, the three image signals will reduce energies of the in-phase baseband reception signal I_rx and the quadrature baseband reception signal Q_rx at the frequency of $f_{rxsig}=f_{txlo}+f_{sig}-f_{rxlo}$.

To sum up, the interference can be reduced by compensation, for example, after a single frequency signal generator 1011 generates an in-phase baseband transmission signal and a quadrature baseband transmission signal, compensation against IQ mismatch of the transmission path and carrier leakage is performed on the in-phase baseband transmission signal and the quadrature baseband transmission signal; accordingly, in the reception path 102, compensation against IQ mismatch of the reception path is performed on I_rx and Q_rx in a digital form, which are obtained after they passing through an ADC 1027*a* and ADC 1027*b* respectively.

Figure 2:
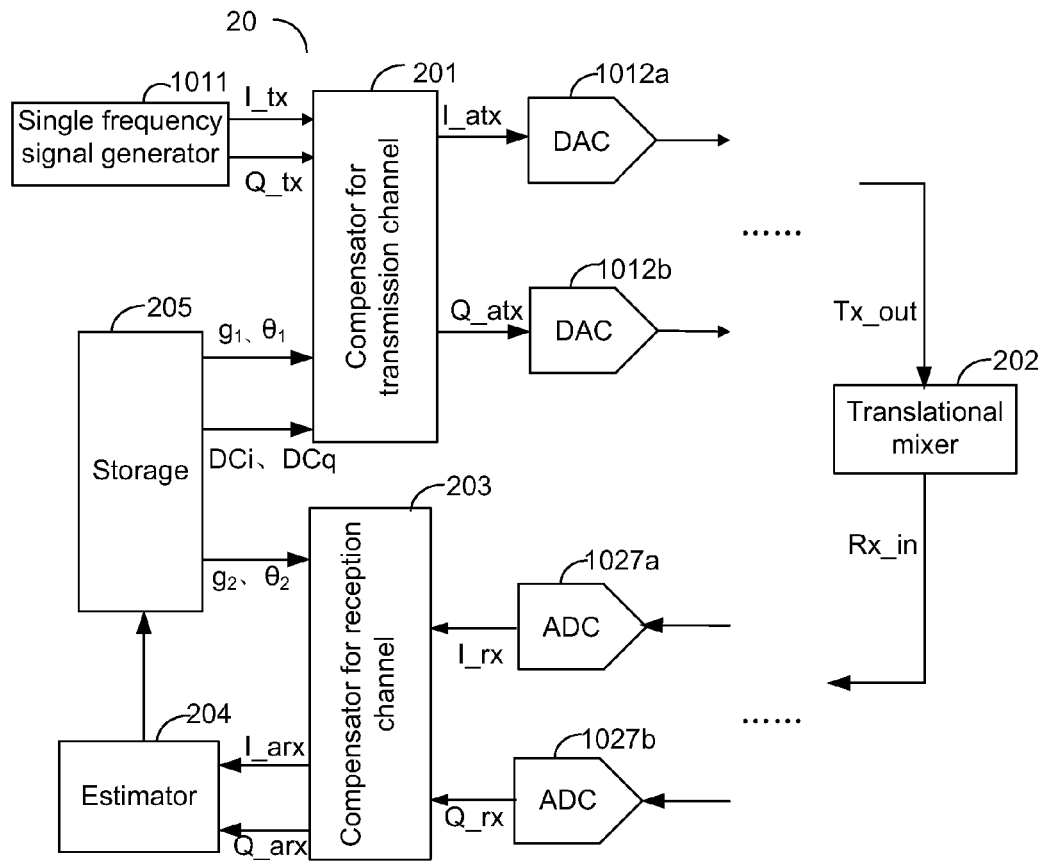
FIG. 2 is a schematic structural diagram of a system for calibrating an RF transceiver according to an embodiment of the disclosure.

In an embodiment of the disclosure, as shown in FIG. 2, provided is a system 20 for calibrating an RF transceiver, which can be applied in an RF transmission/reception system 10 as shown in FIG. 1, it can be appreciated that the RF transmission/reception system shown in FIG. 1 is for description of the technical solutions according to embodiments of the disclosure only and not limited to what shown in FIG. 1; in the embodiment, the system 20 is applied in the RF transmission/reception system as shown in FIG. 1, in conjunction with the description of the RF transmission/reception system shown in FIG. 1, it can be appreciated that there remains, in FIG. 2, parts and devices of the RF transmission/reception system 10, which relates to the system 20, and other parts represented by ellipsis dots are as same as those of the RF transmission/reception system 10 shown in FIG. 1.

The system 20 may include a compensator 201 for a transmission path, a compensator 203 for a reception path, an estimator 204, a memory 205 and a translational mixer 202, specifically, the memory 205 is configured to store compensation parameters;

herein stored compensation parameters include transmission related compensation parameters and reception related parameters used to be respectively provided to the compensator 201 of the transmission path and to the compensator 203 of the reception path for implementing signal compensation;

herein the transmission related compensation parameters include a first transmission path compensation parameter $g_1$, a second transmission path compensation parameter $\theta_1$, a first DC compensation parameter DCi and a second DC compensation parameter DCq;

the reception related compensation parameters include a first reception path compensation parameter $g_2$ and a second reception path compensation parameter $\theta_2$.

The compensator 201 for the transmission path is configured to receive an in-phase baseband transmission signal I_tx and a quadrature baseband transmission signal Q_tx, compensate, through amplification and superposition, the in-phase baseband transmission signal I_tx and a received quadrature baseband transmission signal Q_tx to obtain a compensated in-phase baseband transmission signal I_atx and a compensated quadrature baseband transmission signal Q_atx, transmit the compensated in-phase baseband transmission signal I_atx to a DAC 1012*a* of a transmission I branch 101*a*, and transmit the compensated quadrature baseband transmission signal Q_atx to a DAC 1012*b* of a transmission Q branch 101*b* so that a transmission path 101 of the RF transmission/reception system 10 can obtain a transmission RF signal Tx_out according to the compensated in-phase baseband transmission signal I_atx and the compensated quadrature baseband transmission signal Q_atx;

it can be appreciated that the specific process for the RF transmission/reception system 10 to obtain the transmission RF signal Tx_out can be implemented as described with reference to FIG. 1, and the detailed description thereof will be omitted therein.

herein the in-phase baseband transmission signal I_tx and the quadrature baseband transmission signal Q_tx are generated by a single frequency generator 1011 of the RF transmission/reception system 10;

specifically, the compensator 201 for the transmission path amplifies the in-phase baseband transmission signal I_tx with an amplification factor of $(1-g_1)$, superposes an amplified in-phase baseband transmission signal I_tx and a quadrature baseband transmission signal Q_tx amplified with an amplification factor of $\theta_1$, and superposes a superposed signal and a first DC compensation parameter DCi to obtain the compensated in-phase baseband transmission signal I_atx= $(1-g_1)\cos(2\pi f_{sig}t+\phi_{sig})+\theta_1\sin(2\pi f_{sig}t+\phi_{sig})+$DCi;

the compensator 201 for the transmission path amplifies the quadrature baseband transmission signal Q_tx with an amplification factor of $(1+g_1)$, superposes an amplified quadrature baseband transmission signal Q_tx and an in-phase baseband transmission signal I_tx amplified with an amplification factor of $\theta_1$, and superposes a superposed signal and a second DC compensation parameter DCq to obtain the compensated quadrature baseband transmission signal Q_atx=$(1+g_1)\sin(2\pi f_{sig}t+\phi_{sig})+\theta_1\cos(2\pi f_{sig}t+\phi_{sig})+$DCq.

Figure 3A:
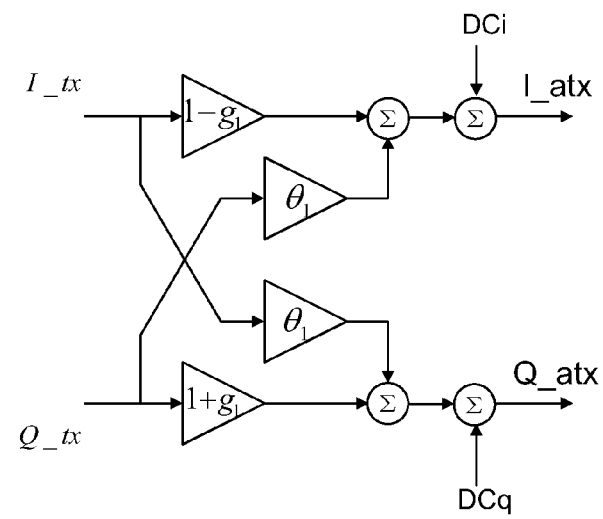
FIG. 3a is diagram showing a circuit for implementing a compensator for a transmission path according to an embodiment of the disclosure.

Schematically, a circuit for implementing the compensator 201 for the transmission path can be shown in FIG. 3*a*.

A first signal obtained from amplification of the in-phase baseband transmission signal I_tx using a first amplifier with an amplification factor of $(1-g_1)$ is superposed through a first adder with a second signal obtained from amplification of the quadrature baseband transmission signal Q_tx using a second amplifier with an amplification factor of $\theta_1$ so as to obtain a third signal; and the third signal is superposed through a second adder with a first DC compensation parameter DCi to obtain the compensated in-phase baseband transmission signal I_atx=$(1-g_1)\cos(2\pi f_{sig}t+\phi_{sig}+\theta_1\sin(2\pi f_{sig}t+\phi_{sig})+$DCi.

A fourth signal obtained from amplification of the quadrature baseband transmission signal Q_tx using a third amplifier with an amplification factor of $(1+g_1)$ is superposed through a third adder with a fifth signal obtained from amplification of the in-phase baseband transmission signal I_tx using a fourth amplifier with an amplification factor of $\theta_1$ so as to obtain a sixth signal; and the sixth signal is superposed through a fourth adder with a second DC compensation parameter DCq to obtain the compensated quadrature baseband transmission signal Q_atx=$(1+g_1)\sin(2\pi f_{sig}t+\phi_{sig})+\theta_1\cos(2\pi f_{sig}t+\phi_{sig})+$DCq.

The Translational Mixer 202 (TM) is configured to compensate a received transmission RF signal Tx_out transmitted by the RF transmission/reception system 10 with a difference between a transmission LO frequency and a reception LO frequency, and transmit a compensated transmission RF signal Tx_out as a reception RF signal Rx_in to the reception path 102 of the RF transmission/reception system 10 so that the RF transmission/reception system obtains, according to the reception RF signal Rx_in, the in-phase baseband reception signal I_rx of the reception I branch 102a of the RF transmission/reception system 10 and the quadrature baseband reception signal Q_rx of the reception Q branch 102b of the RF transmission/reception system 10.

Specifically, the TM 202 can replace the RF loop 103 in FIG. 1; the TM 202 can generate a compensation signal $S_{tm}=\cos(2\pi f_{tm}t+\phi_{tm})$, and transmit a signal obtained from mixing of the compensation signal $S_{tm}$ and the transmission RF signal Tx_out as a reception RF signal Rx_in to the reception path 102 of the RF transmission/reception system 10, wherein $f_{tm}$ is the difference between the transmission LO frequency and the reception LO frequency, and $\phi_{tm}$ is the phase of the compensation signal.

Figure 3B:
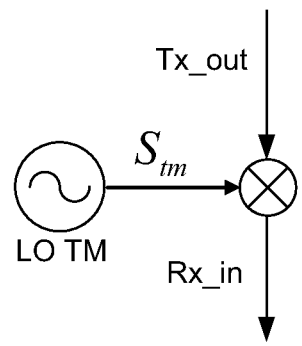
FIG. 3b is diagram showing a circuit for implementing a translational mixer according to an embodiment of the disclosure.
Figure 3C:
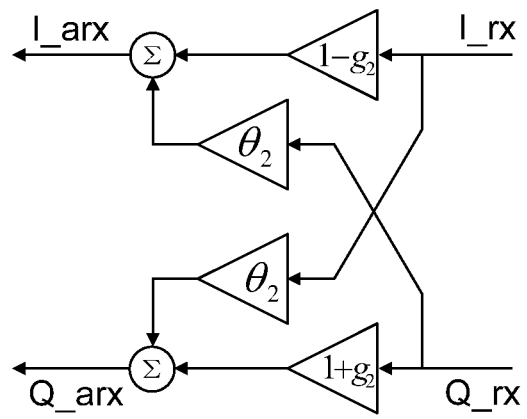
FIG. 3c is diagram showing a circuit for implementing a compensator for a reception path according to an embodiment of the disclosure.

Schematically, a circuit for implement the TM 202 can be shown in FIG. 3b, the compensation signal $S_{tm}=\cos(2\pi f_{tm}t+\phi_{tm})$ is generated by a translational mixing local oscillator, wherein $f_{tm}$ is the difference between the transmission LO frequency and the reception LO frequency, and $\phi_{tm}$ is the phase of the compensation signal; then the mixer transmits a signal obtained from mixing of the compensation signal $S_{tm}$ and the transmission RF signal Tx_out as a reception RF signal Rx_in to the reception path 102.

The compensator 203 of the reception path is configured to receive the in-phase baseband reception signal I_rx and the quadrature baseband reception signal Q_rx, which are transmitted from the reception I branch 102a and the reception Q branch 102b of the RF transmission/reception system 10, and compensate, through amplification and superposition, the received in-phase baseband reception signal I_rx and the received quadrature baseband reception signal Q_rx to obtain a compensated in-phase baseband reception signal I_arx and a compensated quadrature baseband reception signal Q_arx, and transmits the compensated in-phase baseband reception signal I_arx and the compensated quadrature baseband reception signal Q_arx to the estimator 204;

specifically, the compensator 203 for the reception path amplifies the in-phase baseband reception signal I_rx with an amplification factor of $(1-g_2)$, and superposes an amplified in-phase baseband reception signal I_rx and a quadrature baseband reception signal Q_rx amplified with an amplification factor of $\theta_2$ to obtain the compensated in-phase baseband reception signal I_arx; and the compensator 203 for the reception path amplifies the quadrature baseband reception signal Q_rx with an amplification factor of $(1+g_2)$, and superposes an amplified quadrature baseband reception signal Q_rx and an in-phase baseband reception signal I_rx amplified with an amplification factor of $\theta_2$ to obtain the compensated quadrature baseband reception signal Q_arx.

Schematically, a circuit for implementing the compensator 203 for the reception path can be shown in FIG. 3b.

A seven signal obtained from amplification of the in-phase baseband reception signal I_rx using a fifth amplifier with an amplification factor of $(1-g_2)$ is superposed through a fifth adder with an eighth signal obtained from amplification of the quadrature baseband reception signal Q_rx using a sixth amplifier with an amplification factor of $\theta_2$ so as to obtain the compensated in-phase baseband reception signal I_arx.

A ninth signal obtained from amplification of the quadrature baseband reception signal Q_rx using a seventh amplifier with an amplification factor of $(1+g_2)$ is superposed through a sixth adder with a tenth signal obtained from amplification of the in-phase baseband reception signal I_rx using an eighth amplifier with an amplification factor of $\theta_2$ so as to obtain the compensated quadrature baseband reception signal Q_arx.

It can be appreciated that the amplification factors of the above amplifier can be preset in respective amplifiers after the compensator 201 for the transmission path and the compensator 203 for the reception path receive, from the memory 205, corresponding transmission related compensation parameters and reception related compensation parameters.

The estimator 204 is configured to estimate the compensation parameters according to the compensated in-phase baseband reception signal I_arx and the compensated quadrature baseband reception signal Q_arx, and transmit the estimated compensation parameters to the memory so that the memory replaces existing compensation parameters with the estimated compensation parameters.

Figure 4:
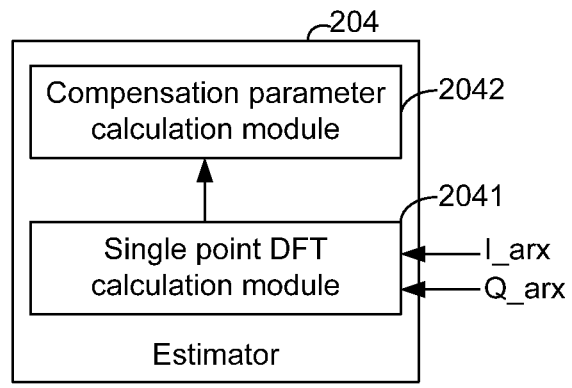
FIG. 4 is a schematic structural diagram of an estimator according to an embodiment of the disclosure.

Herein the estimator may include a single point Discrete Fourier Transform (DFT) calculation module 2041 and a compensation parameter calculation module 2042, as shown in FIG. 4, specifically, the single point DFT calculation module 2041 is configured to receive the compensated in-phase baseband reception signal I_arx and the compensated quadrature baseband reception signal Q_arx transmitted by the compensator 203 for the reception path;

A complex signal $(I\_arx+j\times Q\_arx)$ of the baseband reception signal is obtained according to the compensated in-phase baseband reception signal I_arx and the compensated quadrature baseband reception signal Q_arx, where j represents a complex unit which can be obtained from square root of $-1$.

Figure 5:
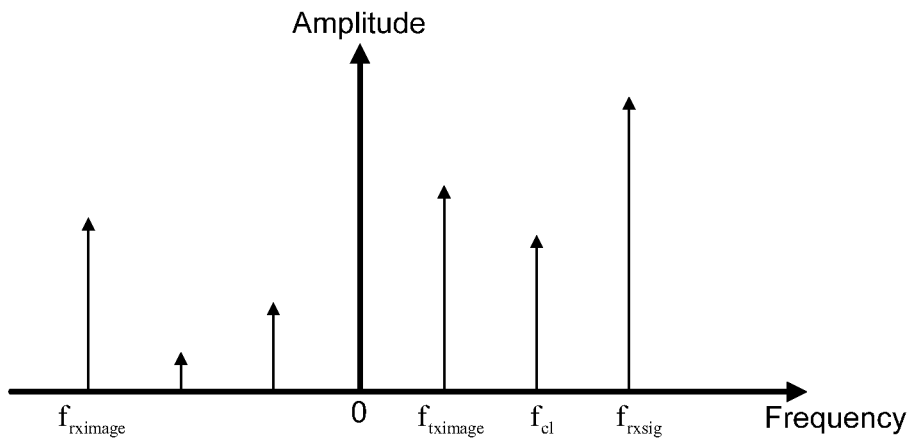
FIG. 5 is a schematic diagram showing amplitude-frequency characteristics of a complex signal of a baseband reception signal according to an embodiment of the disclosure.

The single point DFT calculation is performed on the complex signal $(I\_arx+j\times Q\_arx)$ of the baseband reception signal to obtain respective frequencies $f_{tximage}$, $f_{cl}$, and $f_{rximage}$ at which image signals generated from IQ mismatch of the transmission path, carrier leakage and IQ mismatch of the reception path are located;

wherein $f_{tximage}=f_{txlo}-f_{sig}-f_{rxlo}+f_{tm}$, $f_{cl}=f_{txlo}-f_{rxlo}+f_{tm}$ and $f_{rximage}=-(f_{txlo}+f_{sig}-f_{rxlo}+f_{tm})$, $f_{sig}$ are frequencies of the in-phase baseband transmission signal and the quadrature baseband transmission signal generated by the single frequency signal generator of the RF transmission/reception system, $f_{txlo}$ is the LO frequency of the transmission local oscillator of the RF transmission/reception system, $f_{rxlo}$ is the LO frequency of the reception local oscillator of the RF transmission/reception system, and $f_{tm}$ is the frequency of the compensation signal generated by the local oscillator of the translational mixer;

in the embodiment, TM 202 transmits, as the reception RF signal Rx_in, the signal obtained from mixing of the compensation signal $S_{tm}$, with a frequency of $f_{tm}$ and the transmission RF signal Tx_out, to the reception path 102, thus the three image signals generated from IQ mismatch of the transmission path, carrier leakage and IQ mismatch of the reception path are located respectively at frequencies $f_{tximage}=f_{txlo}-f_{sig}-f_{rxlo}+f_{tm}$, $f_{cl}=f_{txlo}-f_{rxlo}+f_{tm}$ and $f_{rximage}=-(f_{txlo}+f_{sig}-f_{rxlo}+f_{tm})$; accordingly, the compensated in-phase baseband reception signal I_arx and the compensated quadrature baseband reception signal Q_arx are located at a frequency of $f_{rxsig}=(f_{txlo}+f_{sig}-f_{rxlo}+f_{tm})$; in a schematic diagram showing amplitude-frequency characteristics in FIG. 5, the abscissa axis represents frequencies and the ordinate axis represents amplitudes of signals, and it can be seen from FIG. 5 that for abscissas, $f_{rxsig}$ and $f_{tximage}$ are symmetrical with respect to $f_{cl}$, $f_{rxsig}$ and $f_{rximage}$ are symmetrical with respect to $f=0$, thus the single point DFT module 2041 can obtain frequencies at which the three image signals are located according to the above two symmetrical relations;

powers of the image signal generated from IQ mismatch of the transmission path, of the image signal generated from carrier leakage and of the image signal generated from IQ mismatch of the reception path are obtained according to the complex signal of the baseband reception signal and the frequencies $f_{tximage}$, $f_{cl}$ and $f_{rximage}$ at which the three image signals are located, and the powers of the three image signals are transmitted to the compensation parameter calculation module 2042;

firstly, the complex signal of the baseband reception signal is multiplied by three sequences $e^{-j(2\pi f_{tximage}/f_s*N)}$, $e^{-j(2\pi f_{cl}/f_s*N)}$ and $e^{-j(2\pi f_{rximage}/f_s*N)}$ respectively, and impact of other signals on respective powers of multiplied complex signals is reduced through a low pass filter to obtain filtered signals $I_{tximage}+jQ_{tximage}$, $I_{cl}+jQ_{cl}$ and $I_{rximage}+jQ_{rximage}$; wherein $f_s$ is a sampling frequency of an ADC 1027a and of an ADC 1027b, and N is a sequence length;

then, the power of the image signal generated from IQ mismatch of the transmission path of the RF transmission/reception system 10 is obtained by calculating $|I_{tximage}|+|Q_{tximage}|$, the power of the image signal generated from carrier leakage of the RF transmission/reception system 10 is obtained by calculating $|I_{cl}|+|Q_{cl}|$, and the power of the image signal generated from IQ mismatch of the reception path of the RF transmission/reception system 10 is obtained by calculating $|I_{rximage}|+|Q_{rximage}|$, wherein |●| represents a modulo of ●;

the compensation parameter calculation module 2042 is configured to estimate compensation parameters that minimize powers of the three image signals according to the powers of the three image signals and a new binary search proposed in the embodiment of the disclosure; the estimated compensation parameters are transmitted to the memory 205 so that the memory 205 updates existing compensation parameters to the estimated compensation parameters transmitted by the compensation parameter calculation module 2042.

It is noteworthy that it can be seen, from the expression LOI_tx of the transmission in-phase LO signal and the expression LOQ_tx of the transmission quadrature LO signal both resulted from IQ mismatch of the transmission path, that the image signal generated from IQ mismatch of the transmission path is only related to parameters $\epsilon_1$ and $\phi_1$, thus it can be concluded, in conjunction with the compensated in-phase baseband transmission signal I_atx and the compensated quadrature baseband transmission signal Q_atx, that when $g_1=\epsilon_1$ and $\theta_1=\phi_1$, the power of the image signal result from IQ mismatch of the transmission path is minimized; similarly, the image signal generated from IQ mismatch of the reception path is only related to parameters $\epsilon_2$ and $\phi_2$, thus when $g_2=\epsilon_2$ and $\theta_2=\theta_2$, the power of the image signal generated from IQ mismatch of the reception path is minimized; in addition, powers of the image signal resulted from carrier leakage can be searched to obtain a first DC compensation parameter DCi and a second DC compensation parameter DCq that minimize the power of the image signal resulted from carrier leakage.

It can be seen from above analysis that three parameter groups, i.e., the first transmission path compensation parameter $g_1$ and the second transmission path compensation parameter $\theta_1$, the first reception path compensation parameter $g_2$ and the second reception path compensation parameter $\theta_2$, and the first DC compensation parameter DCi and the second DC compensation parameter DCq, are independent from one another, thus the three parameter groups can be calculated in parallel to shorten time taken for calculating the compensation parameters;

schematically, the above three parameter groups are independent from one another and can be calculated in parallel, thus the new binary search proposed by the embodiment of the disclosure can be performed in parallel on the above three parameter groups to acquire compensation parameters minimizing powers of the three image signals; in simplify the description of the above calculation process, the first transmission path compensation parameter $g_1$ and the second transmission path compensation parameter $\theta_1$ can be taken as a first parameter group corresponding to the power of the image signal generated from IQ mismatch of the transmission path, the first reception path compensation parameter $g_2$ and the second reception path compensation parameter $\theta_2$ can be taken as a second competition group corresponding to the power of the image signal generated from IQ mismatch of the reception path, and the first DC compensation parameter DCi and the second DC compensation parameter DCq can be taken as a third parameter group corresponding to the power of the image signal generated from the carrier leakage; processes of calculating the three parameter groups using the new binary search proposed by the embodiment of the disclosure are similar to one another, in the embodiment of the disclosure, any parameter group is selected from the above three parameter groups and described in detailed, and other two parameter groups can be calculated according to a process similar to that described in detail.

Figure 6:
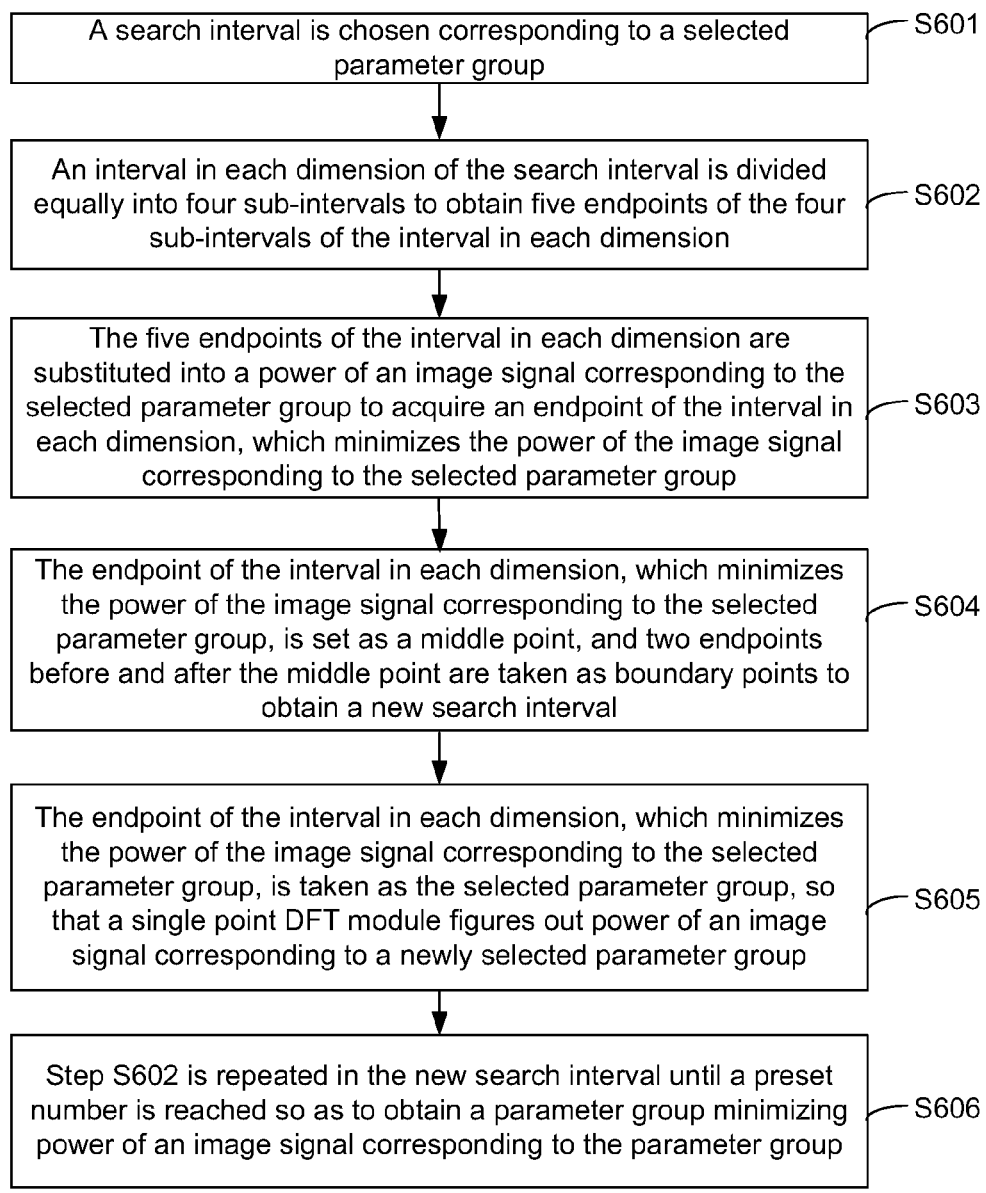
FIG. 6 is a schematic flowchart showing a process for calculating a parameter group according to an embodiment of the disclosure.

As shown in FIG. 6, the specific process is as follows.

S601, a search interval is chosen corresponding to a selected parameter group;

taking the first parameter group as an example, since the first parameter group includes two parameters, an initial search interval corresponding to the first parameter group can be a two-dimensional interval; therefore, the first transmission path compensation parameter $g_1$ can be set as a first dimensional parameter, accordingly, the second transmission path compensation parameter $\theta_1$ can be set as a second dimensional parameter; it can be appreciated that the first dimensional parameter can also be the second transmission path compensation parameter $\theta_1$ and accordingly the second dimensional parameter can then be the first transmission path compensation parameter $g_1$, the disclosure is not limited in this regard;

S602, an interval in each dimension of the search interval is divided equally into four sub-intervals to obtain five endpoints of the four sub-intervals of the interval in each dimension, it can be appreciated that five endpoints of the interval in each dimension are arranged in sequence;

S603, the five endpoints of the interval in each dimension are substituted into a power of an image signal corresponding to the selected parameter group to acquire an endpoint of the interval in each dimension, which minimizes the power of the image signal corresponding to the selected parameter group;

taking the first parameter group as an example, the five endpoints of the interval in each dimension can be substituted into $|I_{tximage}|+|Q_{tximage}|$ corresponding to the first parameter group for calculation to acquire an endpoint of the first parameter group, which minimizes $|I_{tximage}|+|Q_{tximage}|$;

S604, the endpoint of the interval in each dimension, which minimizes the power of the image signal corresponding to the selected parameter group, is set as a middle point, and two endpoints before and after the middle point are taken as boundary points to obtain a new search interval;

taking the first parameter group as an example, an endpoint of the interval in each dimension, which minimizes $|I_{tximage}|+$ $|Q_{tximage}|$, can be set as a middle point, and two endpoints before and after the middle point can be taken as boundary points to obtain a new search interval;

S605, the endpoint of the interval in each dimension, which minimizes the power of the image signal corresponding to the selected parameter group, is taken as the selected parameter group, so that a single point DFT module figures out power of an image signal corresponding to a newly selected parameter group;

taking the first parameter group as an example, an endpoint of the interval in each dimension, which minimizes $|I_{tximage}| + |Q_{tximage}|$, can be taken as the first transmission path compensation parameter $g_1$ and the second transmission path compensation parameter $\theta_1$, and corresponding compensation parameters stored in the memory 205 are updated so that the system 20 figures out a new $|I_{tximage}| + |Q_{tximage}|$; and S606, step S602 is repeated in the new search interval until a preset number is reached so as to obtain a parameter group minimizing power of an image signal corresponding to the parameter group.

Taking the first parameter group as an example, step S602 can be repeated in the new search interval until a preset number is reached so as to obtain a first transmission path compensation parameter $g_1$ and a second transmission path compensation parameter $\theta_1$ minimizing $|I_{tximage}| + |Q_{tximage}|$.

It can be appreciated that steps S601 to S606 can be used in processes for estimation of the second parameter group and the third parameter group, and they are similar to that of the first parameter group, and can be implemented by changing corresponding parameter groups and powers of relevant image signals, thus detailed description thereof will be omitted.

It needs to be noted that when an initially selected search interval in which the first parameter group, i.e., $g_1$ and $\theta_1$ is searched includes $\epsilon_1$ and $\phi_1$ after N (N→∞, ∞ is infinity) repetitions of steps S601 to S606 are performed, global optimums of the first transmission path compensation parameter $g_1$ and of the second transmission path compensation parameter $\theta_1$ can be acquired; at this time, errors of the finally obtained first transmission path compensation parameter $g_1$ and of the second transmission path compensation parameter $\theta_1$ are not larger than $L/2^{N+1}$, where L represents the length of the initial search interval and N represents preset implementation number; and the search time is equal to T×(2N+1), where T represents a calculation time for a single point.

It further needs to be noted that on one hand, when the initially selected search interval in which parameters $g_1$ and $\theta_1$ are searched doesn't include $\epsilon_1$ and $\phi_1$, steps S601 to S606 can only acquire, within the search interval, points that are closest to $\epsilon_1$ and $\phi_1$ for the first transmission path compensation parameter $g_1$ and the second transmission path compensation parameter $\theta_1$, thus only optimal solutions can be obtained that are not global optimums; on the other hand, parameters $g_1$ and $\theta_1$ are correlated, and according to the correlation, when an initial search point of any one of the parameters $g_1$ and $\theta_1$ is relatively far from its optimal point, a search result of the other of the parameters $g_1$ and $\theta_1$ is also relatively far from the other parameter's optimal point, thus a search result may have a large error, and finally only local optimum can be obtained.

In order to solve the problem, before step S601, a process can be included that determines an initial search interval corresponding to the first parameter group, and this process can be regarded as a process for roughly calculating the parameters $g_1$ and $\theta_1$ so that the roughly estimated range of parameters $g_1$ and $\theta_1$ can include $\epsilon_1$ and $\phi_1$, and the roughly estimated range can be taken as the initially selected search interval of the steps S601 to S606. The process for determining an initial search interval corresponding to the first parameter group can be a process where steps S601 to S606 are performed three to five times, and it can also be a process where any other estimation algorithm applied to discrete values, such as a particle filter algorithm or Sequential Importance Sampling (SIS), is used to obtain a high probability interval for $\epsilon_1$ and $\phi_1$ so that the high probability interval is taken as an initial search interval corresponding to the first parameter group.

For the second or third parameter group, similarly, before step S601, a process can be included that determines an initial search interval corresponding to the second or third parameter group, and this process can also be regarded as a process for roughly calculating the second or third parameter group so that the roughly estimated range of the second or third group can include $\epsilon_2$ and $\phi_2$ as well as carrier leaked signals, and the roughly estimated range can be taken as the initially selected search interval of the steps S601 to S606 for the second or third parameter group. The process for determining an initial search interval corresponding to the second or third parameter group can also be a process where steps S601 to S606 are performed three to five times, and it can also be a process where any other estimation algorithm applied to discrete values, such as a particle filter algorithm or Sequential Importance Sampling (SIS), is used.

Therefore, the system 20 can obtain directly the three parameter groups through the estimator 204 according to the powers of the three image signals.

It needs to be noted that due to independence between the three parameter groups, the calculation processes for the first parameter group, the second parameter group and the third parameter group can be performed in parallel, and time taken for estimating compensation parameters can be saved through a space sacrificed for time manner; then after N iterations, below parameters can be obtained that include the first transmission path compensation parameter $g_1$ and the second transmission path compensation parameter $\theta_1$, the first reception path compensation parameter $g_2$ and the second reception path compensation parameter $\theta_2$, and the first DC compensation parameter DCi and the second DC compensation parameter DCq.

The embodiments of the disclosure provide a method and system for calibrating an RF transceiver, relevant compensation parameters are obtained by performing parameter search on image signals of baseband reception signals, which are generated from IQ mismatch of the transmission path and of the reception path and from carrier leakage, thus impacts resulted from IQ mismatch of the transmission path and of the reception path and from carrier leakage are eliminated, and carrier leakage of the transmission path and IQ mismatch of the transmission path and of reception path are calibrated.

An embodiment of the disclosure further provides a computer storage medium, in which computer-readable instructions are included, wherein the computer-readable instructions are configured to implement the method for calibrating an RF transceiver described above.

It should be appreciated by those skilled in the art that embodiments of the disclosure can be provided as a method, system or computer program product. Therefore, the disclosure can be in the form of a hardware embodiment, a software embodiment or a embodiment combining both hardware and software. In addition, the disclosure can be in the form of a computer program product implemented on one or more computer usable storage media (including but not limiting to a magnetic disk storage and an optical storage) containing computer usable program codes.

The disclosure is described with reference to flow charts and/or block diagrams of the method, device (system) and computer program product according to embodiments of the disclosure. It should be appreciated that computer program instructions can be used to implement each process and/or block in flow charts and/or block diagrams and to implement the combination of processes and/or blocks in the flow charts and/or the block diagrams. Such computer program instructions can be provided to a processor of a general-purpose computer, a special-purpose computer, an embedded processor or other programmable data processing device so as to form a machine so that an instruction implemented by the processor of the computer or other programmable data processing device generates a device for implementing a function specified in one or more processes of a flow chart and/or one or more blocks of a block diagram.

Such computer program instructions can also be stored in a computer readable storage capable of directing a computer or other programmable data processing devices to operate in a specific way so that an instruction stored in the computer readable storage generates an artifact including an instructing device which can implement a function specified in one or more processes of a flow chart and/or one or more blocks of a block diagram.

Such computer program instructions can also be loaded onto a computer or other programmable data processing device so that a series of operation steps are implemented on the computer or other programmable data processing device to generate a computer-implemented processing and therefore an instruction implemented on the computer or other programmable devices provides a step for implementing a function specified in one or more processes of a flow chart and/or one or more blocks of a block diagram.

What described are merely preferable embodiments of the disclosure, and are not intended to limit the disclosure.

The invention claimed is:

1. A system for calibrating a Radio Frequency (RF) transceiver, applied in an RF transmission/reception system, comprising a compensator for a transmission path, a compensator for a reception path, an estimator, a memory and a translational mixer, wherein the memory is configured to store compensation parameters;

wherein the compensator for the transmission path is configured to compensate, through amplification and superposition, a received in-phase baseband transmission signal I_tx and a received quadrature baseband transmission signal Q_tx to obtain a compensated in-phase baseband transmission signal I_atx and a compensated quadrature baseband transmission signal Q_atx, and process the compensated in-phase baseband transmission signal I_atx and the compensated quadrature baseband transmission signal Q_atx through the transmission path and a Digital to Analog Converter (DAC) of the RF transmission/reception system to form and output a transmission RF signal Tx_out;

the translational mixer is configured to compensate a received transmission RF signal Tx_out with a difference between a transmission LO frequency and a reception LO frequency, and transmit a compensated Tx_out as a reception RF signal Rx_in to the reception path of the RF transmission/reception system to form respectively an in-phase baseband reception signal I_rx of an Reception I branch and a quadrature baseband reception signal Q_rx of a Reception Q branch;

wherein the compensator for the reception path is configured to compensate, through amplification and superposition, a received in-phase baseband reception signal I_rx and a received quadrature baseband reception signal Q_rx to obtain a compensated in-phase baseband reception signal I_arx and a compensated quadrature baseband reception signal Q_arx, and transmit the compensated in-phase baseband reception signal I_arx and the compensated quadrature baseband reception signal Q_arx to the estimator; and wherein the estimator is configured to estimate compensation parameters of the compensated in-phase baseband reception signal I_arx and of the compensated quadrature baseband reception signal Q_arx, and update the compensation parameters stored in the memory using estimated compensation parameters.

2. The system according to claim 1, wherein the compensator for the transmission path is configured to amplify the in-phase baseband transmission signal I_tx using a first amplifier to obtain a first signal, amplify the quadrature baseband transmission signal Q_tx using a second amplifier to obtain a second signal, superpose the first signal and the second signal using a first adder to obtain a third signal, and then superpose the third signal and a first DC compensation parameter DCi using a second adder to obtain the compensated in-phase baseband transmission signal I_atx;

wherein the compensator for the transmission path is further configured to amplify the quadrature baseband transmission signal Q_tx using a third amplifier to obtain a fourth signal, amplify the in-phase baseband transmission signal I_tx using a fourth amplifier to obtain a fifth signal, superpose the fourth signal and the fifth signal using a third adder to obtain a sixth signal, and then superpose the sixth signal and a second DC compensation parameter DCq using a fourth adder to obtain the compensated quadrature baseband transmission signal Q_atx.

3. The system according to claim 1, wherein the translational mixer is configured to generate a compensation signal $S_{tm}$ through a local oscillator of the translational mixer, mix the compensation signal $S_{tm}$ and the transmission RF signal Tx_out to obtain a mixed signal, and transmit the mixed signal as the reception RF signal to the reception path of the RF transmission/reception system.

4. The system according to claim 1, wherein the compensator for the reception path is configured to amplify the in-phase baseband reception signal I_rx using a fifth amplifier to obtain a seventh signal, amplify the quadrature baseband reception signal Q_rx using a sixth amplifier to obtain an eight signal, and superpose the seventh signal and the eighth signal using a fifth adder to obtain the compensated in-phase baseband reception signal I_arx;

wherein the compensator for the reception path is further configured to amplify the quadrature baseband reception signal Q_rx using a seventh amplifier to obtain a ninth signal, amplify the in-phase baseband reception signal I_rx using a eighth amplifier to obtain a tenth signal, and superpose the ninth signal and the tenth signal using a sixth adder to obtain the compensated quadrature baseband reception signal Q_arx.

5. The system according to claim 1, wherein the estimator comprises a single point Discrete Fourier Transform (DFT) calculation module and a compensation parameter calculation module, wherein the single point DFT calculation module is configured to receive the compensated in-phase baseband reception signal I_arx and the compensated quadrature baseband reception signal Q_arx transmitted by the compensator for the reception path, obtain, according to the compensated in-phase baseband reception signal I_arx and the compensated quadrature baseband reception signal Q_arx, powers of an image signal generated from IQ mismatch of the transmission path of the RF transmission/reception system, of an image signal generated from carrier leakage of the RF transmission/reception system and of an image signal generated from IQ mismatch of the reception path of the RF transmission/reception system, and transmit the powers of the three image signals to the compensation parameter calculation module; and wherein the compensation parameter calculation module is configured to estimate a compensation parameter minimizing the powers of the three image signals by searching powers of the three image signals through a binary search, and transmit the estimated compensation parameter to the memory so that the memory updates its existing compensation parameter to the estimated compensation parameter.

6. The system according to claim 5, wherein the compensation parameter calculation module is further configured to, before estimating the powers of the three image signals through a binary search, determine an initial searching interval corresponding to the powers of the three image signals.

7. A method for calibrating a Radio Frequency (RF) transceiver, applied in a system for calibrating the RF transceiver, the system being applied in the RF transceiver and comprising a compensator for a transmission path, a compensator for a reception path, an estimator, a memory and a translational mixer, the method comprising:

receiving, by the compensator for the transmission path, an in-phase baseband transmission signal I_tx and a quadrature baseband transmission signal generated by a single frequency signal generator of the RF transceiver;

compensating, by the compensator for the transmission path through amplification and superposition, the in-phase baseband transmission signal I_tx and the quadrature baseband transmission signal Q_tx to obtain a compensated in-phase baseband transmission signal I_atx and a compensated quadrature baseband transmission signal Q_atx, and processing the compensated in-phase baseband transmission signal I_atx and the compensated quadrature baseband transmission signal Q_atx through the transmission path and a DAC of the RF transceiver to form and output a transmission RF signal Tx_out;

compensating, by the translational mixer, a received transmission RF signal Tx_out with a difference between a transmission LO frequency and a reception LO frequency, and transmitting a compensated Tx_out as a reception RF signal Rx_in to the reception path of the RF transceiver to form respectively an in-phase baseband reception signal I_rx of an Reception I branch and a quadrature baseband reception signal Q_rx of a Reception Q branch;

compensating, by the compensator for the reception path through amplification and superposition, the received in-phase baseband reception signal I_rx and the received quadrature baseband reception signal Q_rx to obtain a compensated in-phase baseband reception signal I_arx and a compensated quadrature baseband reception signal Q_arx, and transmitting the compensated in-phase baseband reception signal I_arx and the compensated quadrature baseband reception signal Q_arx to the estimator; and estimating, by the estimator, compensation parameters of the compensated in-phase baseband reception signal I_arx and of the compensated quadrature baseband reception signal Q_arx, and updating compensation parameters stored in the memory using estimated compensation parameters, wherein the compensation parameters comprise transmission related compensation parameters and reception related compensation parameters.

8. The method according to claim 7, wherein the compensating, by the compensator for the transmission path through amplification and superposition, the in-phase baseband transmission signal I_tx and the quadrature baseband transmission signal Q_tx to obtain a compensated in-phase baseband transmission signal I_atx and a compensated quadrature baseband transmission signal Q_atx comprises:

amplifying, by the compensator for the transmission path, the in-phase baseband transmission signal I_tx with a first preset amplification factor, superposing an amplified in-phase baseband transmission signal I_tx and a quadrature baseband transmission signal Q_tx amplified with a second preset amplification factor, and superposing a superposed signal and a first DC compensation parameter DCi to obtain the compensated in-phase baseband transmission signal; and amplifying, by the compensator for the transmission path, the quadrature baseband transmission signal Q_tx with a third preset amplification factor, superposing an amplified quadrature baseband transmission signal Q_tx and an in-phase baseband transmission signal I_tx amplified with the second preset amplification factor, and superposing a superposed signal and a second DC compensation parameter DCq to obtain the compensated quadrature baseband transmission signal.

9. The method according to claim 7, wherein the compensating, by the compensator for the reception path through amplification and superposition, the received in-phase baseband reception signal I_rx and the received quadrature baseband reception signal Q_rx to obtain a compensated in-phase baseband reception signal I_arx and a compensated quadrature baseband reception signal Q_arx comprises:

amplifying, by the compensator for the reception path, the in-phase baseband reception signal I_rx with a fourth preset amplification factor, and superposing an amplified in-phase baseband reception signal I_rx and a quadrature baseband reception signal Q_rx amplified with a fifth preset amplification factor to obtain the compensated in-phase baseband reception signal I_arx; and amplifying, by the compensator for the reception path, the quadrature baseband reception signal Q_rx with a sixth preset amplification factor, and superposing an amplified quadrature baseband reception signal Q_rx and an in-plane baseband reception signal I_rx amplified with the fifth preset amplification factor to obtain the compensated quadrature baseband reception signal Q_arx.

10. The method according to claim 9, wherein the compensating, by the translational mixer, a received transmission RF signal Tx_out with a difference between a transmission LO frequency and a reception LO frequency comprises:

generating, by the translational mixer, a compensation signal $S_{tm}$ with a frequency of $f_{tm}$, wherein $f_{tm}$ is the difference between the transmission LO frequency and the reception LO frequency; and mixing, by the translational mixer, the compensation signal $S_{tm}$ and the transmission RF signal Tx_out.

11. The method according to claim 7, wherein the estimating, by the estimator, compensation parameters of the compensated in-phase baseband reception signal I_arx and of the compensated quadrature baseband reception signal Q_arx comprises:
   receiving, by the estimator, the compensated in-phase baseband reception signal I_arx and the compensated quadrature baseband reception signal Q_arx transmitted by the compensator for the reception path;
   obtaining, according to the compensated in-phase baseband reception signal I_arx and the compensated quadrature baseband reception signal Q_arx, powers of an image signal generated from IQ mismatch of the transmission path of the RF transceiver, of an image signal generated from carrier leakage of the RF transceiver and of an image signal generated from IQ mismatch of the reception path of the RF transceiver; and
   estimating, by the estimator, a compensation parameter minimizing the powers of the three image signals by searching powers of the three image signals through a binary search.

12. The method according to claim 11, wherein the obtaining, by the estimator according to the compensated in-phase baseband reception signal I_arx and the compensated quadrature baseband reception signal Q_arx, powers of an image signal generated from IQ mismatch of the transmission path of the RF transceiver, of an image signal generated from carrier leakage of the RF transceiver and of an image signal generated from IQ mismatch of the reception path of the RF transceiver comprises:
   performing, by the estimator, a single point DFT calculation on a complex signal of a baseband reception signal acquired from the compensated in-phase baseband reception signal I_arx and the compensated quadrature baseband reception signal Q_arx to obtain respective frequencies $f_{tximage}$, $f_{cl}$ and $f_{rximage}$ at which the image signals generated from IQ mismatch of the transmission path, carrier leakage and IQ mismatch of the reception path are located;
   multiplying, by the estimator, the complex signal of the baseband reception signal by three sequences $e^{-j(2\pi f_{tximage}/f_s * N)}$, $e^{-j(2\pi f_{cl}/f_s * N)}$ and $e^{-j(2\pi f_{rximage}/f_s * N)}$ respectively, reducing, through a low pass filter, impact of other signals on respective powers of multiplied complex signals to obtain filtered signals $I_{tximage}+jQ_{tximage}$, $I_{cl}+jQ_{cl}$ and $I_{rximage}+jQ_{rximage}$, wherein $f_s$ is a sampling frequency of an Analog to Digital Converter (ADC) of the Reception I branch of the RF transceiver and of an ADC of the Reception Q branch of the RF transceiver, and N is a sequence length;
   obtaining the power of the image signal generated from IQ mismatch of the transmission path by calculating $|I_{tximage}|+|Q_{tximage}|$, obtaining the power of the image signal generated from carrier leakage by calculating, and obtaining the power of the image signal generated from IQ mismatch of the reception path by calculating $|I_{rximage}|+|Q_{rximage}|$, wherein |●| represents a modulo of ●.

13. The method according to claim 12, wherein the estimating, by the estimator, a compensation parameter minimizing the powers of the three image signals by searching powers of the three image signals through a binary search comprises:
   taking, by the estimator, a first transmission path compensation parameter $g_1$ and a second transmission path compensation parameter $\theta_1$ of the transmission related compensation parameter as a first parameter group corresponding to the power of the image signal generated from IQ mismatch of the transmission path, taking a first reception path compensation parameter $g_2$ and a second reception path compensation parameter $\theta_2$ of the reception related compensation parameter as a second parameter group corresponding to the power of the image signal generated from IQ mismatch of the reception path, and taking a first DC compensation parameter DCi and a second DC compensation parameter DCq of the transmission related compensation parameter as a third parameter group corresponding to the power of the image signal generated from carrier leakage; and
   calculating, by the estimator, the first parameter group, the second parameter group and the third parameter group respectively, which comprises:
   step 1A, selecting, by the estimator, any parameter group of the first parameter group, the second parameter group and the third parameter group, and a two-dimensional search interval corresponding to a selected parameter group;
   step 2A, dividing, by the estimator, an interval in each dimension of the two-dimensional search interval equally into four sub-intervals to obtain five endpoints of the four sub-intervals of the interval in each dimension;
   step 3A, substituting, by the estimator, the five endpoints of the interval in each dimension into a power of an image signal corresponding to the selected parameter group to acquire an endpoint of the interval in each dimension, which minimizes the power of the image signal corresponding to the selected parameter group;
   step 4A, setting, by the estimator, as a middle point, the endpoint of the interval in each dimension, which minimizes the power of the image signal corresponding to the selected parameter group, and taking two endpoints before and after the middle point as boundary points to obtain a new search interval;
   step 5A, taking, by the estimator, as the selected parameter group, the endpoint of the interval in each dimension, which minimizes the power of the image signal corresponding to the selected parameter group so that a single point DFT module figures out power of an image signal corresponding to a newly selected parameter group; and
   step 6A, repeating, by the estimator, the step 2A in the new search interval until a preset number is reached so as to obtain a parameter group minimizing power of an image signal corresponding to the parameter group.

14. The method according to claim 13, further comprising: before the calculating, by the estimator, the first parameter group, the second parameter group and the third parameter group respectively, determining by the estimator initial search intervals corresponding respectively to the first parameter group, the second parameter group and the third parameter group, which comprises:
   determining, by the estimator, the initial search intervals corresponding respectively to the first parameter group, the second parameter group and the third parameter group by implementing the steps 1A to 6A three to five times, or through a particle filter algorithm or Sequential Importance Sampling (SIS).

15. A non-transitory computer storage medium, in which computer-readable instructions are included, wherein the computer-readable instructions are configured to implement the method for calibrating an RF transceiver according to claim 7.

* * * * *